(12) United States Patent
Li

(10) Patent No.: US 10,387,974 B2
(45) Date of Patent: Aug. 20, 2019

(54) SOCIAL NETWORKING APPARATUS AND METHODS

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 176 days.

(21) Appl. No.: 14/283,204

(22) Filed: May 20, 2014

(65) Prior Publication Data

US 2015/0341452 A1 Nov. 26, 2015

(51) Int. Cl.
*H04L 29/08* (2006.01)
*H04L 29/06* (2006.01)
*G06Q 50/00* (2012.01)
*G06F 3/06* (2006.01)

(52) U.S. Cl.
CPC .......... *G06Q 50/01* (2013.01); *G06F 3/0611* (2013.01); *G06F 3/0604* (2013.01)

(58) Field of Classification Search
CPC ............ G06N 5/02; G06N 5/04; G06N 5/046; G06N 99/005; G06Q 10/063; G06Q 50/01; A61B 5/002; A61B 5/0022; A61B 5/0205; A61B 6/563; A61B 8/4245; A61B 8/4472; A61B 8/565
USPC ................ 709/204–245; 705/26; 370/338
See application file for complete search history.

(56) References Cited

U.S. PATENT DOCUMENTS

| | | | | |
|---|---|---|---|---|
| 2004/0083127 A1* | 4/2004 | Lunsford | ............ | G06Q 10/063 705/7.32 |
| 2007/0169165 A1* | 7/2007 | Crull | .................... | G06F 21/335 725/135 |
| 2008/0028313 A1* | 1/2008 | Ebert | .................... | G06O 30/02 715/730 |
| 2008/0098313 A1* | 4/2008 | Pollack | .................. | G06F 3/048 715/753 |
| 2010/0036912 A1* | 2/2010 | Rao | ..................... | H04L 12/5865 709/204 |
| 2010/0042511 A1* | 2/2010 | Sundaresan | ............ | G06Q 10/10 705/26.1 |
| 2011/0099486 A1* | 4/2011 | Nesladek | ............. | G01C 21/265 715/753 |
| 2011/0142016 A1* | 6/2011 | Chatterjee | ............. | G06Q 30/02 370/338 |
| 2011/0276410 A1* | 11/2011 | Hjelm | ..................... | G06Q 30/00 705/14.66 |
| 2012/0192258 A1* | 7/2012 | Spencer | ................ | H04W 12/06 726/7 |
| 2013/0036051 A1* | 2/2013 | Giordano | ............. | G06Q 20/325 705/44 |
| 2013/0054333 A1* | 2/2013 | Ross | ....................... | G06Q 30/02 705/14.25 |
| 2013/0109412 A1* | 5/2013 | Nguyen | ............ | G06O 30/0207 455/456.3 |
| 2013/0198383 A1* | 8/2013 | Tseng | ................... | H04L 63/102 709/225 |
| 2013/0238979 A1* | 9/2013 | Sayers, III | ........ | G06F 17/30867 715/234 |

(Continued)

*Primary Examiner* — David R Lazaro
*Assistant Examiner* — Berhanu Shitayewoldetadik

(57) ABSTRACT

Embodiments introduced describe social networks with auto enrollment and password-free access. Users are automatically enrolled in social networks based on their experience, such as past shopping or dining activities. Network links are presented to users on a platform, where multiple networks or websites are accessible directly, i.e., ID and password are not required for network or website access.

15 Claims, 6 Drawing Sheets

(56) References Cited

U.S. PATENT DOCUMENTS

| | | | |
|---|---|---|---|
| 2013/0268357 A1* | 10/2013 | Heath | H04L 63/00 |
| | | | 705/14.53 |
| 2013/0326375 A1* | 12/2013 | Barak | H04L 65/403 |
| | | | 715/758 |
| 2014/0081750 A1* | 3/2014 | Hosp | G06Q 30/0207 |
| | | | 705/14.53 |
| 2014/0137026 A1* | 5/2014 | Matas | G06Q 50/01 |
| | | | 715/780 |
| 2017/0019409 A1* | 1/2017 | Shalunov | H04L 12/6418 |

* cited by examiner

# SOCIAL NETWORKING APPARATUS AND METHODS

CROSS REFERENCE TO RELATED APPLICATION

This application is entitled to the benefit of Provisional Patent Application Ser. No. 61/825,537, filed May 21, 2013.

FEDERALLY SPONSORED RESEARCH

Not applicable

SEQUENCE LISTING OR PROGRAM

Not applicable

BACKGROUND

Field of Invention

This invention relates to social networks, and more specifically, to social networks based on users' experience and to social networks with easy access.

Description of Prior Art

A social networking system provides an online service, platform, or website that implements social networks, where users may share a variety of information, interests, activities, ideas, or feelings. A social networking environment is mostly web-based, and it enables users to interact with each other over the Internet, via online posts, instant or short messages, tweets, or emails.

Current social networks, social networking groups, or social networking circles are constructed by connections, such as friendships, social relationships, family relationships, or common interests. A user may be represented by a profile containing personal info which is posted by the user and shared within other users of a network circle. In some cases, users of a circle may not know each other, but may be connected by common interest in a subject like a topic, product or event. Before joining a circle, either voluntarily or by invitation, usually a user would spend time gathering related info and then make a decision. Most times, a user has to take initiatives, such as going through a registration process, in order to enroll in a network circle.

As a result, the scope of present social networks or social networking circles is limited by personal connections, likes, and interest. In addition, a user has to make an effort, no matter how small it is, to join a social circle.

Social networks or circles are often operated by different companies, and a user has to do log-in or log-on process at different websites separately. In other words, a user has to provide user ID and password repeatedly when switching from one circle to another circle. As a consequence, accessing multiple networks or circles is burdened with submitting user name and pass code again and again.

More important, enrolment in a networking circle or group is not automatic. It takes time to think about a suitable network circle, to decide, and to go through a boring registration process.

Therefore, there exists a need for a social networking apparatus and method which implements a network that admits users beyond relationships and likes, requires less effort from users, costs less time to join, enrolls users automatically, and is easy and convenient to access.

The word "post" as verb or "posting" is referred broadly as transmitting information from a user to a server via a communication network to let others in a certain environment, such as a social networking setting, view the transmitted information. The word "post" as noun includes information posted or submitted by a user on the Internet, or user generated content on the Internet or in any network. Posted information may cover a hyperlink or a uniform resource locator (URL), audio, video, an image, a symbol, a sign, a word, a number, a reply, a message, an e-mail, news article, blog entry, survey, etc. In practice, a user may or may not be allowed to post information without registration or identification. Posts are preferably hosted on a web site, but may also be hosted locally using local database or local server system.

The word "event" as noun is referred broadly as something happened or happening physically or virtually. Examples include shopping, dining, gaming, travelling, service, a class in school, a concert or ritual, political, cultural, religious or sport activities, or other personal matters or collective behaviors.

The word "experience" as verb or noun is referred broadly as a process of physical or spiritual involvement of an event or object, or a physical, spiritual, or virtual journey happened or happening. Event or journey examples include going shopping, dining, gaming, travelling, being serviced, taking a class, attending a concert, participating political, religious, sport, or community activities, or other personal or collective activities.

The word "transaction" is generally referred as a purchasing process during which, for example, a merchant receives a payment and in exchange, a consumer receives a product, or a process during which a merchant receives a payment and in exchange, a consumer is going to receive a product, or a process during which a consumer receives or is going to receive a product as a result of an arrangement or event happened. Transaction may also be referred as a process which is not related to purchase, e.g. registration of a free event, electronic recognition at a place using a positioning system as a proof of being there, or other activities which connect a user to an event.

The term "web site" or "website" is broadly referred to any domain or subdomain or a domain plus a uniform resource locator prefix.

The term "document" is referred broadly to any machine-readable and machine-storable information, or any information in a digital format, including textual information, a web page, image file, audio file, video file, other web files, embedded information, etc.

OBJECTS AND ADVANTAGES

Accordingly, several main objects and advantages of the present invention are:

a). to provide improved social networks;
b). to provide such a social network which automatically seeks and connects users based on users' experience;
c). to provide such a social network which automatically enrolls users based on users' experience;
d). to provide such a social network which is easy and convenient to access; and
e). to provide a platform for easy access not only to multiple networks, but also to related electronic documents and feedback sites.

Further objects and advantages will become apparent from a consideration of the drawings and ensuing description.

SUMMARY

In accordance with the present invention, users' experience may result in auto enrolment in a social network with an almost effortless process. Users of a network may have certain similar experience, and thus sharing information or feelings on the experience may be helpful for everyone. Moreover, multiple networks, electronic documents, and feedback sites may be accessed directly from a networking platform. The access is easy, convenient, and no ID or password is required.

DRAWING FIGURES

REFERENCE NUMERALS IN DRAWINGS

| 10 Client | 12 Communication network |
|---|---|
| 14 Processor | 16 Server |
| 20 Readable Medium | 22 Communication network |
| 24 Server | 26 Database |
| 28 Router/Switch | 30 Networking System |
| 32 User | 52 User |
| 54 User | 56 User |
| 58 Website button | 60 Social Circle Button |
| 62 e Doc Button | 64 Survey Button |
| 66 Display | 68 Social Circle |
| 70 Social Circle Button | 72 Social Circle Button |
| 74 Social Circle Button | 76 Ad Banner |
| 78 Display | 80 Client |
| 82 Networking System | 84 Store |
| 86 Store | 88 Store |
| 90 Store | 92 Website button |
| 94 e Doc Button | 96 Survey Button |
| 98 Button | |

300, 302, 304, 306, 308, 310, 311, 312, 314 are exemplary steps.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

Figure 1:
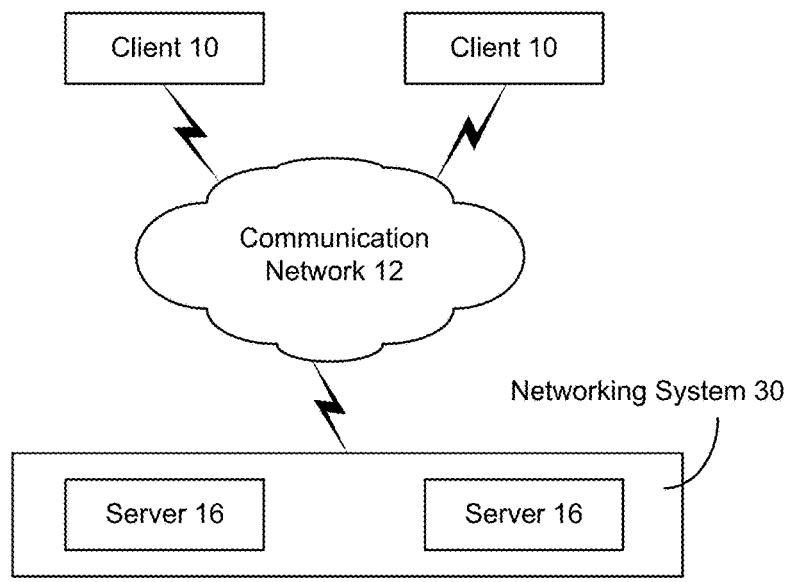
FIG. 1 is a block diagram showing a prior-art social network environment.

FIG. 1 is an exemplary diagram of prior-art social networking environment which may be used to implement some principles of current invention. It may involve clients 10 and networking system 30 which may contain multiple servers 16. Clients 10 and system 30 are connected via a communication network 12. The numbers of users and servers in FIG. 1 are arbitrary for showing the principles only. The clients or servers may be the same or different in characteristics and their functionality may change in practical applications.

Clients 10 may cover a range of entities such as a thread or process running on a devices, an object executable by a device, an electronic device, e.g., a computer, a wireless gadget (such as mobile phone, smartphone, smart watch, tablet computer, wearable device), digital television (DTV), internet protocol television (IPTV), play stations, etc.

The word "server" means a system or systems which may have similar functions and capacities as one or more servers. Main components of server may include one or more processors, which control and process data and information by executing software, logic, code, or stored executable instructions, or carrying out any other suitable functions. A server and/or processor, as a computing device, may include any hardware, firmware, software, or a combination. In the most compact form, thanks to the advance of microelectronic technologies, a server may be built on a single processor chip. In the figure, servers 16 may represent one or more server entities that collect, process, maintain, and/or manage information and documents, execute searches requested by users and deliver search results to users.

Network 12 may cover a range of entities such as a local area network (LAN), a wide area network (WAN), a telephone network, an intranet, the Internet, wireless, and other types of networks. Clients 10 and system 30 may be connected to network 12 or servers 16 connected among themselves by various wired, wireless, optical, direct or relayed connections.

Figure 2:
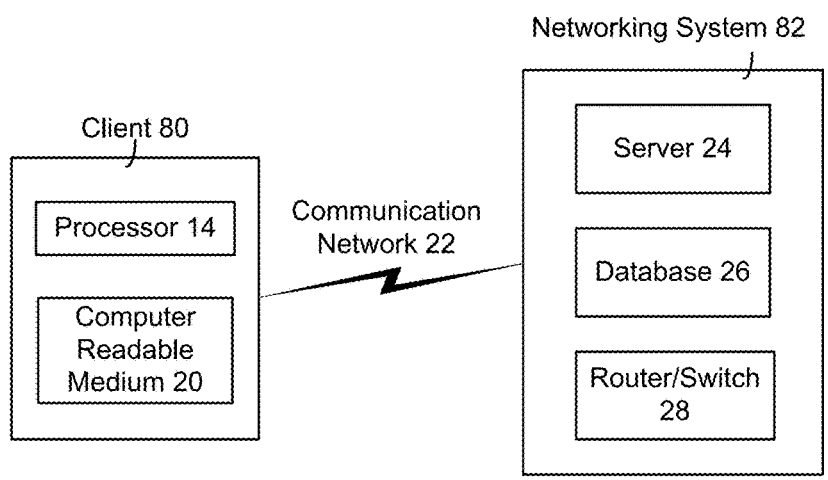
FIG. 2 is a schematic block diagram describing one embodiment in accordance with the present invention.

FIG. 2 is an exemplary block diagram of one embodiment of social network environment according to the present invention. A client system 80 and networking system 82 are connected via a communication network 22. Client 80, like client 10, may represent an electronic device or gadget as mentioned in the above. Client 80 may include a processor 14 and computer readable medium 20. Processor 14 may mean one or more processor chips or systems. Medium 20 may include a memory hierarchy built by one or more memory chips or storage modules like RAM, ROM, FLASH, magnetic, optical and/or thermal storage devices. Processor 14 may run programs or sets of executable instructions stored in medium 20 for performing various functions and tasks, e.g., surfing on the Internet, playing video or music, electronic payment, social networking, sending and receiving messages, executing other applications, etc. Client 80 may include input, output, and communication components, which may be individual modules or integrated with processor 14. Usually, client 80 has a display with a graphical user interface (GUI). Client 80 may also have a voice recognition module to receive audio input from a user.

Networking system 82 may enable and implement various types of social network serving a great number of users. It may exemplarily be divided into three blocks, represented by server 24, database 26, and router and switch 28. Server 24 may comprise one or more servers processing applications, web applications, images, emails, searching tasks, etc. Database 26 may store data associated with users, networks, servers, and various websites. Router and switch 28 may transmit information packets between client 80 and system 82 over network 22 and work as a gatekeeper to and from network 22. As social networks may involve a huge amount of data, which may be uploaded and aggregated by users continuously, a separate database system may be created. A database system may include a large number of storage devices or modules and specialty servers for data management and maintenance.

Figure 3:
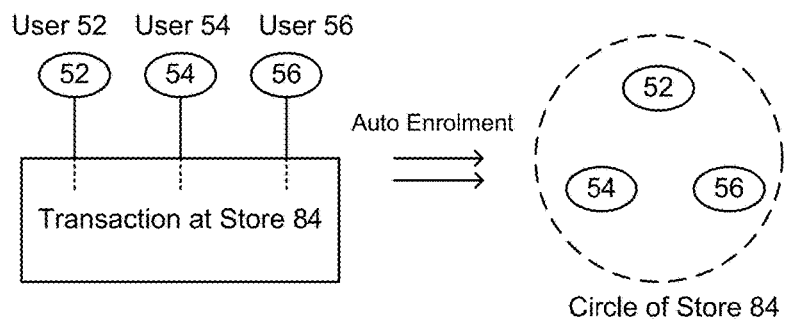
FIGS. 3 and 4 are schematic diagrams showing two social circle embodiments in accordance with the present invention.

FIG. 3 is an illustrative diagram which shows an embodiment to enroll users in a social circle automatically. The exemplary event starts at a store. The focus is on patrons of store. Assume that users 52, 54, and 56 represent three consumers who don't know each other and may not want to explore relationships between each other probably because of busy life style, personality, social custom, cultural background, or other reasons. Relying on relationship-based social networks, these users would not be connected together. On the other hand, interest or hobby based networks may not work to connect them either, since they may not want to start a relationship and then develop it. But there is a common event or a piece of similar experience among them, that is, they all shopped or experienced certain event at a store 84, though not necessarily at the same time. Because the users went shopping at the same place, one person's experience or comments on the store may be useful for the other two. Thus connecting the three users together may be beneficial to all of them. The bonding factor is of their shared experience.

Thus, we may configure a social network circle around store 84 and connect users who have shopped at store 84. For instance, the circle may be configured to take users who have made a transaction at the store within a given time frame. Once a social networking system obtains information that a user made a purchasing transaction at a store, for instance, the system may automatically enroll the user in a circle of the store. No question is asked. No registration is required. Back to FIG. 3, as the three users had made transactions at store 84, they are automatically enrolled in a circle of store 84. The users don't need to look for the circle, and literally don't need to do anything.

To make life simple and easy, it may be designed such that no password is required to access a store circle. Identification may be performed utilizing other means or platform. For example, once a user is recognized or verified by a networking platform, all social circles he or she qualifies may become open and accessible. Thus it may take less effort not only to join a circle, but also to access a circle, compared to current methods, where invitation, reference, application, registration, and password may be required. More details about network access will be provided in discussions below.

Figure 4:
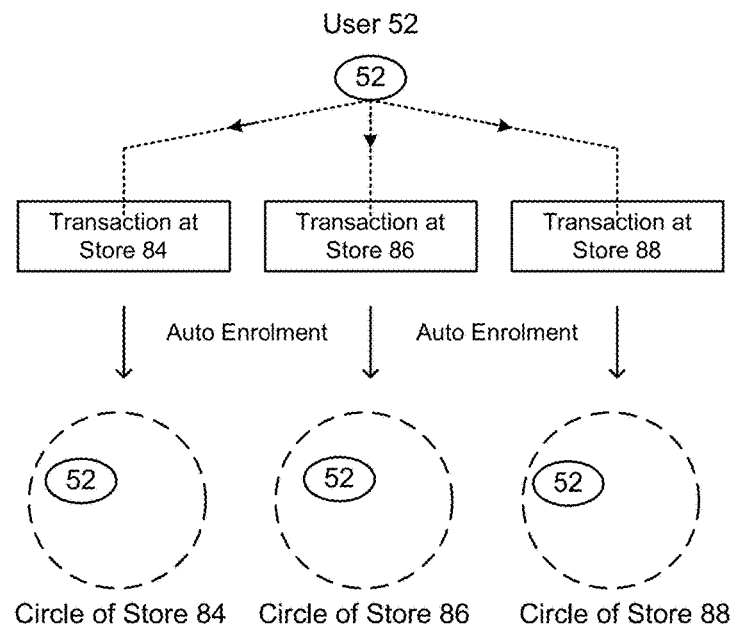

FIG. 4 illustrates schematically another embodiment which focuses on the scenario between a user and multiple circles, where again, shopping experience is used exemplarily. Assume user 52 has made transactions at stores 84, 86, and 88 respectively. Identity of the user may become known when he or she uses credit card, debit card, store card, or a smartphone to pay at store, or through other identification means, like facial recognition of users or smartphone recognition. Next a social network system may get the information through banks, stores, service providers, or other channels. With the info, the network system may automatically enroll user 52 in three circles corresponding to the three stores. Circles of store as discussed here may be configured as an independent entity, operated without any involvement of the store. As a social circle is a venue for free discussion and info exchange, neutrality of circle is desirable by users.

Figure 5:
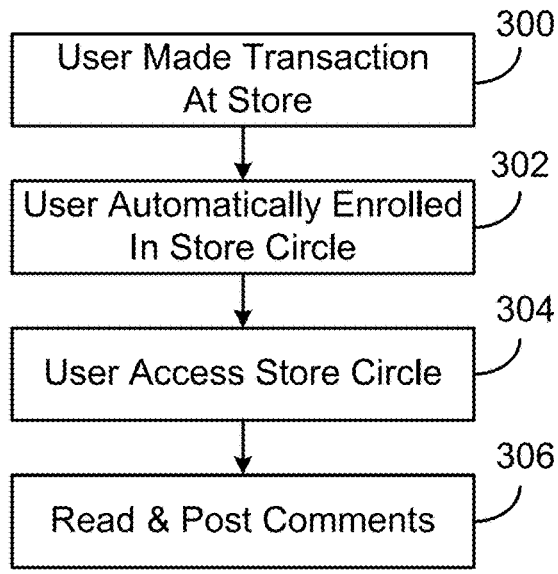
FIGS. 5 and 6 are exemplary flowcharts depicting social circle embodiments in accordance with the present invention.

FIG. 5 shows an exemplary flowchart to depict a process according to one embodiment of the invention. In step 300, a user made a transaction at a store, for instance, made a payment to purchase a product. Next, a networking system may receive the transaction info, which may include but not limited to user name, transaction time, store name, and possibly more purchase details. Then in step 302, the system may automatically enroll the user in a corresponding social network circle which is related to the store, but not controlled by the store. Meanwhile, a message may be sent to the user's device, like smart phone, tablet computer, or desktop computer. The message may be transmitted to an application installed at user's device, so that social circle settings may be updated accordingly. In step 304, the user may log in the network circle, which is accessible free of pass code input, as long as the user is identified. In step 306, the user may start activities in the circle, including reading comments written by other users, posting own comments or documents as permitted by network rules, or reading other contents presented on the circle website.

Figure 6:
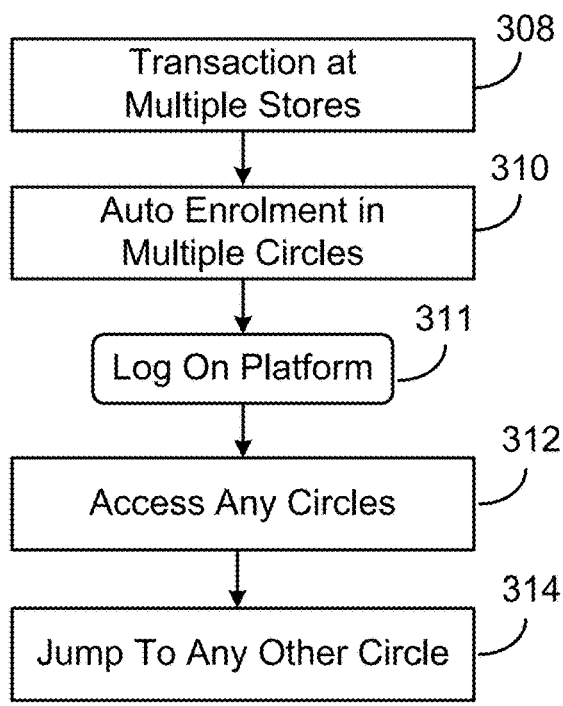

FIG. 6 shows another exemplary flowchart to depict an embodiment about multiple social networks. Assume a user made purchases at several stores as in step 308. Afterwards, info of transaction activities at the stores is transmitted to a networking system. The system then automatically adds the user to related social network circles in step 310. Nest, message of auto enrolment of social circles may be sent to user's device. The device may have a platform or application specifically designed to help access social networking circles. The platform may or may not require a password to log on. Once logging on the platform, as in step 311, a user's identity becomes known. As a result the user doesn't need to provide ID and pass code any longer, which create the opportunity for easy and open access to all relevant social circles. Thus in step 312, a user may enter any social circle presented on the platform. Accessing a circle may just need a click on a screen object using, for instance, mouse or touch pad, or a tap on a touch-sensitive screen using fingertip. Tapping mode is more desirable with smartphone or tablet computer. When visiting a circle, a user may switch to another circle easily, as in step 314. Assume there are icons of other social circles on the website, switching to another circle may just need a click or tap.

Figure 7:
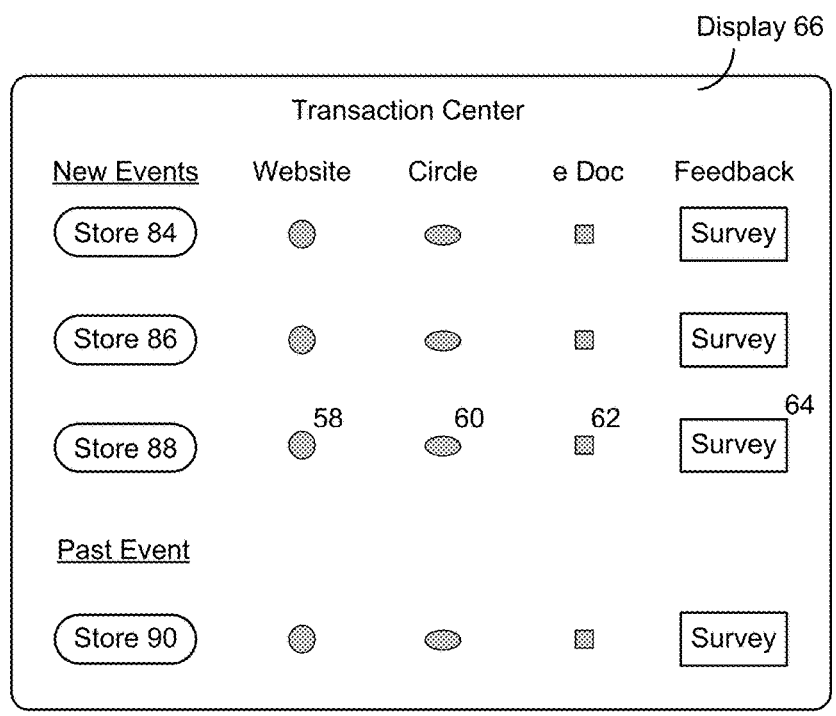
FIGS. 7 and 8 are schematic diagrams showing respectively a platform and a social circle site in accordance with the present invention.

Shown in FIG. 7 is an exemplary diagram of one embodiment of the invention. A display 66 may show a user interface of a device, like a desktop computer, tablet computer or smart phone. The configuration in FIG. 7 represents a platform, which functions as a portal leading to websites of stores and social network circles associated with the stores. The networking platform, which could be called "Transaction Center", may be generated by executing a program or application installed at the device. Assume that a user made some transaction events at stores 84, 86, and 88 recently. Later on, the user joins social circles of the stores automatically. The store names are shown on the left side. Next to the store names there are buttons 58, which, once clicked, lead to store websites. Next is a column of social circle buttons 60, then e-Doc buttons 62, and finally on the far right, survey buttons 64. For the convenience of users, a previous event at store 90 is also displayed.

As shown on the "Transaction Center" page, accessing social circles just needs a click or tap. It can be seen that once a transaction is made, a circle may find a user, not the other way around. And there is no password needed when entering a circle. Social networks or circles become almost effortless to join, as well as easy and convenient to access. In addition, a click or tap on button 62 may have electronic documents in display. The e-documents may include receipts of transaction, transaction records, monthly statements, notices, messages, and so on. Activating buttons 64 gets the website redirected to a survey site or a survey page, where a user may provide feedback by taking a survey or leaving comments.

The networking platform presents a summary of user's recent activities or events, where social circles, related transaction documents are easy and convenient to access. Survey or feedback buttons provide another layer of convenience for users to vent frustration or display happy feelings.

Figure 8:
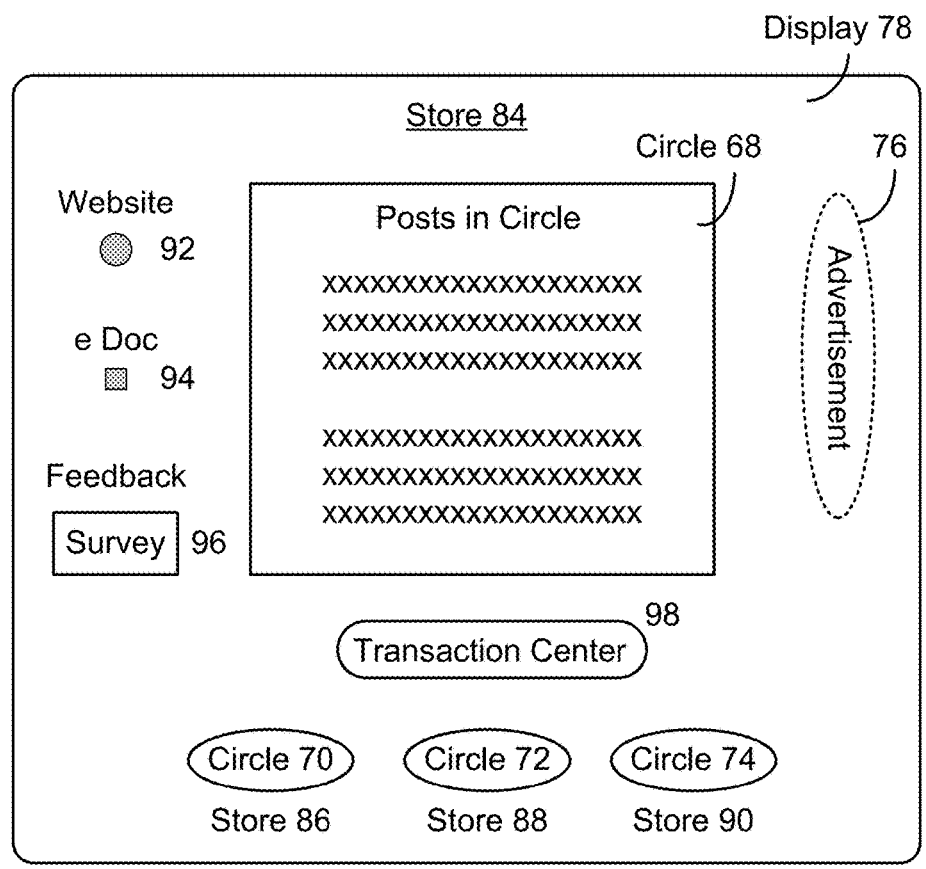

FIG. 8 illustrates schematically a social circle site according to one embodiment. Interface shown on a display 78 may be the result of clicking a social circle button 60 of FIG. 7. There is a title "Store 84" on top area of the display, which means a social circle 68, a website button 92, an electronic document button 94, and a survey button 96 are all about store 84. Circle 68 is shown in a window in the central part of the display. There may be activities happened and/or happening in the circle, where a user may read comments, upload or download documents, discuss with other users, and so on. Buttons 92, 94, 96 may respectively provide convenience for searching store or product info, checking user's own shopping history and record, and posting comments or expressing feelings. An advertisement banner 76 may be arranged to promote stores a user may have visited, products a user may have bought, or other things which advertisers may want to show to a user. Furthermore, there are other buttons on the interface aimed at providing convenience, such as social circle buttons 70, 72, and 74, as well as a "Transaction Center" button 98. Social circle buttons make it easy and simple to switch from circle 68 to any other circle, as it just needs a click or tap. It should be noted that no pass code is needed to jump from one circle to another. Returning to Transaction Center is also easy and simple with a click or tap.

Figure 9:
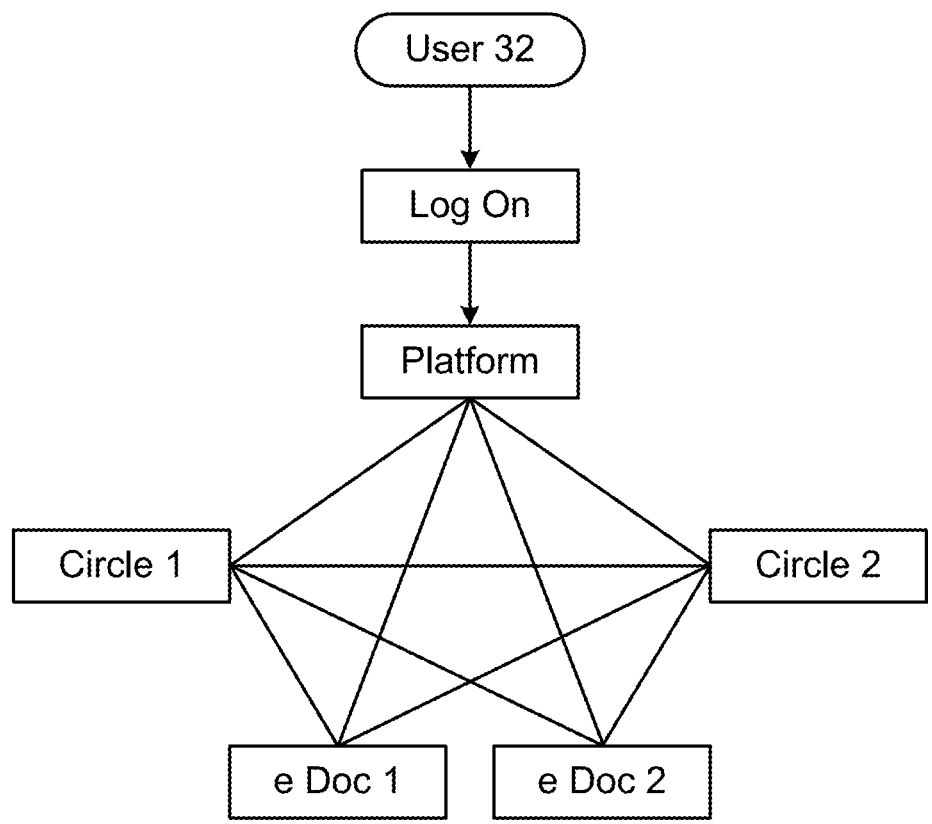
FIG. 9 is a schematic diagram showing a social networking environment involving a platform, social circles, and links to electronic documents in accordance with the present invention.

Now referring to FIG. 9, where an embodiment is depicted in a graphical diagram. A user 32 may log on a networking platform using his or her device. Password may or may not be required depending on the setting. Once on the platform, it becomes like what shown in FIG. 7. Here the user may access freely, without presenting ID or pass code, a social circle 1, a circle 2, e Doc 1, and e Doc 2. It is assumed that circle 1 and e Doc 1 are related to event 1 or entity 1, while circle 2 and e Doc 2 are related to event 2 or entity 2. It also shows that after entering circle 1, a user may still have easy access to e Doc 1, circle 2, e Doc 2, plus the platform site. Similar convenience is provided when checking documents at e Doc 1 or 2, from which it is easy and quick to go to any circle site, or return to the platform. For brevity, easy access to event website and feedback site is omitted.

CONCLUSION, RAMIFICATIONS, AND SCOPE

Thus it can be seen that systems and methods are introduced to provide improved social networking environment and improved access to networks.

The improved methods and environment have the following features and advantages:
(1). Auto enrolment in social networks based upon users' past experience;
(2). Easy and password-free access to multiple social networks using a networking platform; and
(3). Easy and password-free access to electronic documents and feedback sites.

Although the description above contains many specificities, these should not be construed as limiting the scope of the invention but as merely providing illustrations of some of the presently preferred embodiments. Numerous modifications will be obvious to those skilled in the art.

Ramifications:

A social networking circle may be based on user experience of a brand or product as well, which may be more attractive to advertisers since brand or product is a more focused topic than a store. As a result, social circle of certain brand or product may be created. For such a purpose, a networking system has to obtain more details of transaction, such as product name and brand name, to support product and brand circles.

The experience, which social networks utilize to enroll users, may include all kinds of physical, virtual, or spiritual journeys, as explained in the background section.

As there may be hundreds of users who shop at a store and thus get enrolled in a store circle, a user may want to filter out someone who is less relevant or less favored because of geo locations, aged transaction time, less popular post in the past, or other reasons. For example, a user may like to read comments written by users living at a certain district, or making frequent purchases at a store, which may be achieved by filter algorithm.

In FIGS. 7 and 8, a user may have direct access to multiple social networks with one click or one tap, while no ID or password is required. The networks may include social circles arranged for users automatically based on their experience, as well as social groups which users chose and joined by themselves. In the latter case, clicking on a social group link may lead to a log-on website, and usually ID and password have to be entered. But as user's identity is already known, the networking platform may be designed to transmit enough info to the other networking system managing the social group, so that the user's identity may be handed over as well. So the method may enable direct access to more circles. As transfer of personal info is involved, users' authorization and possibly initial setup by users may be needed.

Furthermore, the networking platform may be used as a tool to access other websites, webpages, applications, programs, platforms, or systems which require user ID and password, besides other social networks. The principles are the same. For other websites as an instance, the networking platform may transmit identification info to a server system which administrates the sites. So, like user's identity is known to the platform, it may also become known to the server system, and then to the other sites. Therefore, a password-involved log-in process may not be needed any more when a user accesses those sites.

In real life, most electronic documents are kept by business entities. For instance, users' purchasing records are managed by merchants or financial institutions. Thus access to this information may not be straightforward, as it is a matter of privacy. If a networking system obtains those documents already, it would be an easy task to release them to a user. If not, agreements must be made so that other organizations may accept user identity info sent by a networking system. With user info, an organization may waive regular identification process. Then, a user may access the site directly once logging on the platform. This may make online activities simpler and more convenient, as a user may just need to remember one password to log on a platform. Once on the platform, other sites may become accessible free of log-on hassles.

Lastly, various positioning technologies may be utilized to qualify a user for a social circle. For instance, a social circle of a park, zoo, entertainment site, seminar room, concert hall, may enroll a user automatically once it is detected that the user enters the perimeter of a venue during certain period of time.

Therefore the scope of the invention should be determined by the appended claims and their legal equivalents, rather than by the examples given.

The invention claimed is:

1. An electronic device comprising: a processor, and a memory module coupled to the processor, the processor operable when executing certain instructions to:
   1) receive payment information from a payment made by a user to a predetermined entity;
   2) automatically enroll the user in a first social network related to the entity using the payment information, wherein the first social network is not managed by the entity and the automatic enrolling requires no registration process or other action by the user;
   3) obtain the user's identity when the user accesses a predetermined platform after a login process using an electronic apparatus and send to the user contents for presentation in an interface of the platform, the interface providing access to one or more social networks relevant to the user; 4) wherein providing access to the one or more social networks includes presenting a first interactive element in the interface of the platform, the first interactive element provides access to the first social network, the first interactive element is arranged for the user after the automatic enrolling of the user in the first social network network is related to the entity, the social network is not managed by the entity; and 5) wherein the contents are presented in the interface of the platform in response to activation of the first interactive element by the user using the electronic apparatus.

2. The electronic device according to claim 1 wherein the first social network is accessible to the user without password verification process.

3. The electronic device according to claim 1 wherein a second interactive element is configured for presentation in the interface, the second interactive element provides access to a website, related to the entity.

4. The electronic device according to claim 1 wherein a third interactive element is configured for presentation in the interface, the third interactive element provides access to electronic documents related to the entity.

5. The electronic device according to claim 1 wherein a fourth interactive element is configured for presentation in the interface, the fourth interactive element provides access to a feedback or survey program.

6. A computer-implemented method performed at an electronic device, the electronic device having stored executable instructions, comprising:
   3) receiving payment information from a payment made by a user to a predetermined entity;
   4) automatically enrolling the user in a first social network related to the entity using the payment information, wherein the first social network is not managed by the entity and the automatic enrolling requires no registration process or other action by the user;
   3) obtaining the user's identity when the user accesses a predetermined platform after a login process using an electronic apparatus and sending to the user contents for presentation in an interface of the platform, the interface providing access to one or more social networks relevant to the user;
   4) wherein providing access to the one or more social networks includes presenting a first interactive element in the interface of the platform, the first interactive element provides access to the first social network, the first interactive element is arranged for the user after the automatic enrolling of the user in the first social network; and
   5) wherein the contents are presented in the interface of the platform in response to activation of the first interactive element by the user using the electronic apparatus.

7. The method according to claim 6 wherein the first social network is accessible to the user without password verification process.

8. The method according to claim 6, further including sending to the user a second interactive element for presentation in the interface, the second interactive element provides access to a website related to the entity.

9. The method according to claim 6, further including sending to the user a third interactive element that provides access to electronic documents related to the entity.

10. The method according to claim 6, further including sending to the user a fourth interactive element that provides access to a feedback or survey program.

11. A computer-implemented method performed at an electronic device, the device having stored executable instructions, comprising:
   1) receiving payment information after a plurality of payments is made by a user to a plurality of predetermined entities respectively;
   2) automatically enrolling the user in a plurality of social networks related to the plurality of entities using the payment information, wherein the plurality of social networks is not managed by the plurality of entities and the automatic enrolling requires no registration process or other action by the user;
   3) obtaining the user's identity when the user accesses a predetermined platform after a login process using an electronic apparatus and sending to the user contents for presentation in an interface of the platform, the interface providing access to the plurality of social networks;
   4) wherein providing access to the plurality of social networks including presenting a plurality of first interactive elements in the interface of the platform, the plurality of first interactive elements provides access to the plurality of social networks respectively, the plurality of first interactive elements is arranged for the user after the automatic enrolling of the user in the plurality of social networks; and 5) wherein the contents are presented in the interface of the platform in response to activation of one of the plurality of first interactive elements by the user using the electronic apparatus.

12. The method according to claim 11 wherein the plurality of social networks is accessible to the user without password verification process.

13. The method according to claim 11, further including sending to the user a second interactive element, the second interactive element provides access to a website related to one of the plurality of entities.

14. The method according to claim 11, further including sending to the user a third interactive element that provides access to electronic documents related to one of the plurality of entities.

15. The method according to claim 11, further including sending to the user a fourth interactive element that provides access to a feedback or survey program.

* * * * *